US011426838B2

(12) United States Patent
Takeuchi (10) Patent No.: US 11,426,838 B2
(45) Date of Patent: Aug. 30, 2022

(54) ROTATING TOOL (71) Applicant: MAKITA CORPORATION, Anjo (JP)

(72) Inventor: Hajime Takeuchi, Anjo (JP)

(73) Assignee: MAKITA CORPORATION, Anjo (JP)

(*) Notice: Subject to any disclaimer, the term of this patent is extended or adjusted under 35 U.S.C. 154(b) by 127 days.

(21) Appl. No.: 16/611,796

(22) PCT Filed: Jun. 13, 2018

(86) PCT No.: PCT/JP2018/022629
§ 371 (c)(1),
(2) Date: Nov. 7, 2019

(87) PCT Pub. No.: WO2019/012902
PCT Pub. Date: Jan. 17, 2019

(65) Prior Publication Data
US 2021/0078132 A1    Mar. 18, 2021

(30) Foreign Application Priority Data
Jul. 14, 2017    (JP) .............................. JP2017-138244

(51) Int. Cl.
*B24B 47/26* (2006.01)
*B23Q 11/00* (2006.01)
*B25F 5/00* (2006.01)

(52) U.S. Cl.
CPC .......... *B24B 47/26* (2013.01); *B23Q 11/0092* (2013.01); *B25F 5/001* (2013.01); *B25F 5/008* (2013.01)

(58) Field of Classification Search
CPC ..... B24B 47/26; B23Q 11/0092; B25F 5/001; B25F 5/008
See application file for complete search history.

(56) References Cited

U.S. PATENT DOCUMENTS

| 2002/0066632 | A1* | 6/2002 | Kristen | .................. F16D 67/06 192/17 C |
| 2005/0217873 | A1* | 10/2005 | Gross | ....................... B25C 1/06 173/1 |

(Continued)

FOREIGN PATENT DOCUMENTS

| CN | 101172331 A | 5/2008 |
| CN | 102689293 A | 9/2012 |

(Continued)

OTHER PUBLICATIONS

Machine translation of JP-2005176454-A (Year: 2005).*
Jul. 24, 2018 International Search Report issued in International Patent Application No. PCT/JP2018/022629.
Jan. 14, 2020 International Preliminary Report on Patentability issued in International Patent Application No. PCT/JP2018/022629.

(Continued)

*Primary Examiner* — Anna K Kinsaul
*Assistant Examiner* — Luis G Del Valle
(74) *Attorney, Agent, or Firm* — Oliff PLC (57) ABSTRACT

A grinder includes a brake mechanism configured to brake a spindle and an electrical actuator (a solenoid) that actuates the brake mechanism. The solenoid actuates the brake mechanism in conjunction with a turning OFF of a switch from a driving state of a motor, and releases an actuation of the brake mechanism after a lapse of a predetermined period of time from the turning OFF of the switch.

16 Claims, 9 Drawing Sheets

(56) References Cited

U.S. PATENT DOCUMENTS

| | | | |
|---|---|---|---|
| 2006/0124332 A1* | 6/2006 | Greese | B25B 23/14 173/178 |
| 2008/0105448 A1* | 5/2008 | Hahn | B25B 23/141 173/178 |
| 2011/0139473 A1* | 6/2011 | Braun | B25F 5/001 173/217 |
| 2012/0244788 A1 | 9/2012 | Numata | |
| 2012/0255755 A1* | 10/2012 | Kondo | B25D 11/106 173/178 |
| 2013/0000938 A1* | 1/2013 | Matsunaga | B25B 21/008 173/181 |
| 2013/0023189 A1* | 1/2013 | Numata | B23Q 11/0092 451/344 |
| 2013/0032370 A1* | 2/2013 | Hirabayashi | B25D 11/106 173/47 |
| 2014/0202725 A1* | 7/2014 | Johnson | B25F 5/001 173/217 |
| 2016/0221085 A1* | 8/2016 | Zhong | B25F 5/001 |
| 2016/0342142 A1 | 11/2016 | Boeck et al. | |
| 2017/0264219 A1* | 9/2017 | Takeda | H02P 27/08 |

FOREIGN PATENT DOCUMENTS

| | | | |
|---|---|---|---|
| CN | 102886729 A | | 1/2013 |
| CN | 106457548 A | | 2/2017 |
| JP | 2002-224975 A | | 8/2002 |
| JP | 2004-068252 A | | 3/2004 |
| JP | 2004068252 A | * | 3/2004 |
| JP | 2005-176454 A | | 6/2005 |
| JP | 2005176454 A | * | 6/2005 |
| JP | 2015-208820 A | | 11/2015 |
| JP | 2015208820 A | * | 11/2015 |
| JP | 2016-209956 A | | 12/2016 |
| WO | 2016/084553 A1 | | 6/2016 |

OTHER PUBLICATIONS

Jun. 1, 2021 Office Action issued in Japanese Patent Application No. 2017-138244.

Jun. 20, 2022 Office Action issued in Chinese Patent Application No. 201880041724.7.

* cited by examiner

ROTATING TOOL

BACKGROUND OF INVENTION

This application claims the benefits of International Application No. PCT/JP2018/022629, filed on Jun. 13, 2018, which claims the benefit of Japanese Patent Application Number 2017-138244 filed on Jul. 14, 2017, the disclosures of which are incorporated by reference herein in their entireties.

TECHNICAL FIELD

The present invention relates to a rotating tool, such as a grinder, that rotates a tool bit.

BACKGROUND ART

In a rotating tool, such as a grinder, that performs an operation by rotating a tool bit, such as a disk-shaped grinding wheel, a braking mechanism is disposed in order to stop an inertial rotation of the tool bit in a short period of time when the operation is terminated. As exemplarily illustrated in Japanese Laid Open Patent Publication No. 2016-209956, this braking mechanism is to apply a brake to an output shaft by pressing a brake plate disposed in a front portion of the output shaft of a motor in an ordinary state with a brake shoe.

In use, a push-in operation of an operation member, such as a paddle switch, turns a switch ON and causes a slider to move forward in conjunction, to separate the brake shoe from the brake plate, and thus, the braking is released. Releasing the push-in operation of the operation member turns the switch OFF and causes the slider to retreat to press the brake shoe onto the brake plate, and thus, the brake is applied.

DISCLOSURE OF THE INVENTION

Problems to be Solved by the Invention

However, in a grinder with a large size and especially with a long whole length, a handlebar is, in some cases, disposed to extend at a rear of a motor housing, and a switch and an operation member are disposed on the handlebar. In this case, since a distance between a brake mechanism in a front portion and the operation member in a rear portion is long, it is difficult to dispose a slider to ensure a conjunction with the operation member. Thus, a coupled mechanism becomes complicated to possibly cause a failure to a cooling flow passage of a motor. Since the large-sized grinder also has a large tool bit, such as a disk-shaped grinding wheel, in addition the motor, a large inertia is generated to increase a heat generation of the brake mechanism in braking, thereby leading to degradations of brake characteristics and component service life. While it is considered to employ an electric brake, there have been cases where the employment has been difficult for reasons, such as an overload on the motor.

Therefore, an object of the present invention is to provide a rotating tool that ensures easily and reliably applying a brake to a tool bit even though the rotating tool is large in size.

Solutions to the Problems

In order to achieve the above-described object, there is provided a rotating tool according to first aspect includes a motor, a switch, a rotation shaft, a brake mechanism, and an electrical actuator. The switch operates ON and OFF in association with an operation of an operation member to control a rotation of an output shaft of the motor. The rotation shaft rotates in association with the rotation of the output shaft to rotate a tool bit. The brake mechanism is configured to brake at least the rotation shaft. The electrical actuator actuates the brake mechanism. The electrical actuator actuates the brake mechanism in conjunction with turning OFF of the switch from a driving state of the motor, and releases the actuation of the brake mechanism after a lapse of a predetermined period of time from the turning OFF of the switch.

In the present invention according to second aspect, the electrical actuator is a solenoid.

In the present invention according to third aspect, while the brake mechanism includes a brake operation plate that contacts and separates from a brake plate disposed on a side of the rotation shaft, a clutch mechanism configured to connect and cut off a power from the output shaft to the rotation shaft side is disposed between the output shaft and the rotation shaft. The clutch mechanism includes a clutch operation plate that moves in an axial direction of the output shaft to switch between connection and cut-off of a power. A cam plate is disposed between the brake operation plate and the clutch operation plate. The cam plate rotates in association with an operation of the electrical actuator to cause the brake operation plate to contact and separate from the brake plate and cause the clutch operation plate to move in an axial direction.

In the present invention according to fourth aspect, the clutch mechanism includes a coupling body that moves in a radial direction between a side of the output shaft and the rotation shaft side to couple the two and release the coupling.

In the present invention according to fifth aspect, the coupling body is a steel ball.

In the present invention according to sixth aspect, the electrical actuator and the cam plate are linked with a linking member, and the cam plate rotates via the linking member in association with the operation of the electrical actuator.

In the present invention according to seventh aspect, the linking member is a rotation lever that has a fulcrum portion that serves as a rotational center, an effort portion to which the electrical actuator is coupled to rotate about the fulcrum portion, and a load portion formed between the fulcrum portion and the effort portion to engage with the cam plate.

The present invention according to eighth aspect, includes biasing means that biases the brake operation plate to a side of the cam plate.

In the present invention according to ninth aspect, the biasing means is a coil spring.

The present invention according to tenth aspect, includes retaining means that elastically holds the brake plate with respect to a contacting and separating direction of the brake operation plate.

In the present invention according to eleventh aspect, the retaining means is a retaining ring disposed on an outer periphery of the brake plate, the retaining ring having a plurality of elastic pieces projecting toward a center side and an opposite side of the brake operation plate.

In the present invention according to twelfth aspect, the rotating tool further includes a second brake mechanism configured to brake the output shaft. The second brake mechanism is also actuated and released from actuation by the electrical actuator.

In the present invention according to thirteenth aspect, while the brake mechanism is actuating, redriving of the motor is restricted even though the switch is operated ON.

In the present invention according to fourteenth aspect, the electrical actuator actuates the brake mechanism after a lapse of a predetermined period of time from the turning OFF of the switch from the driving state of the motor.

In the present invention according to fifteenth aspect, while the brake mechanism includes a brake operation plate that contacts and separates from a brake plate disposed on a side of the rotation shaft, a clutch mechanism configured to connect and cut off a power from the output shaft to the rotation shaft side is disposed between the output shaft and the rotation shaft. The clutch mechanism includes a clutch operation plate that moves in an axial direction of the output shaft to switch between connection and cut-off of a power. A cam plate is disposed between the brake operation plate and the clutch operation plate. The cam plate rotates in association with an operation of the electrical actuator to cause the brake operation plate to contact and separate from the brake plate and cause the clutch operation plate to move in an axial direction.

Effects of the Invention

The invention according to claim 1 ensures braking the rotation in the rotation shaft side using the electrical actuator. Accordingly, even a rotating tool large in size can reliably brake the tool bit with an energy smaller than a conventional energy. Since a necessity to dispose the coupled mechanism between the brake mechanism and the operation member is eliminated, the structure is simplified, and a failure to the cooling flow passage of the motor and an influence by a heat generation of the brake can be reduced. Furthermore, since the brake mechanism is released in an initial state where the rotating tool is not used, a responsiveness to an ON operation of the switch by the operation member improves, and no time lag is generated in the rotation of the tool bit.

In particular, with the invention according to claim 2, the brake mechanism is actuatable with a simple configuration by employing the solenoid in addition to the effect of claim 1.

In particular, the invention according to claims 3 and 15 ensures causing the brake mechanism and the clutch mechanism to operate by a move of only one cam plate and ensures a downsizing in an axial direction even though both the mechanisms are attached, in addition to the effect of claim 1 or 2.

In particular, with the invention according to claim 4, the clutch mechanism including the coupling body that moves in the radial direction between the output shaft side and the rotation shaft side to couple the two and releases the coupling ensures the downsized clutch mechanism in the radial direction, in addition to the effect of claim 3.

In particular, with the invention according to claim 6, employing the linking member between the electrical actuator and the cam plate ensures converting the operation of the electrical actuator into the rotation of the cam plate in addition to the effect of claim 3.

In particular, with the invention according to claim 7, the linking member being the rotation lever ensures easily rotating the cam plate using the rotation lever in addition to the effect of claim 6.

In particular, with the invention according to claim 8, employing the biasing means ensures reliably operating the brake operation plate in conjunction with the rotation of the cam plate in addition to the effect of claim 3.

In particular, with the invention according to claim 10, employing the retaining means ensures reduced impact in braking in addition to the effect of claim 3.

In particular, with the invention according to claim 12, employing the second brake mechanism ensures cutting off the power to the rotation shaft side and applying a brake to the output shaft side in addition to the effect of claim 1.

In particular, with the invention according to claim 13, redriving of the motor is restricted even though the switch is operated ON while the brake mechanism is actuating, thereby ensuring reliably applying a brake in addition to the effect of claim 1.

In particular, with the invention according to claim 14, the electrical actuator actuating the brake mechanism after the lapse of the predetermined period of time from the turning OFF of the switch from the driving state of the motor ensures performing a repeated operation of turning the switch ON and OFF with no obstacle in addition to any effects of claim 1.

BRIEF DESCRIPTION OF THE DRAWINGS

FIG. 2A is an explanatory drawing of a clutch/brake mechanism when a switch is turned ON.

FIG. 7B is a perspective view of an operation of a solenoid when the solenoid is turned ON.

DESCRIPTION OF PREFERRED EMBODIMENTS

The following describes embodiments of the present invention based on the drawings.

Figure 1:
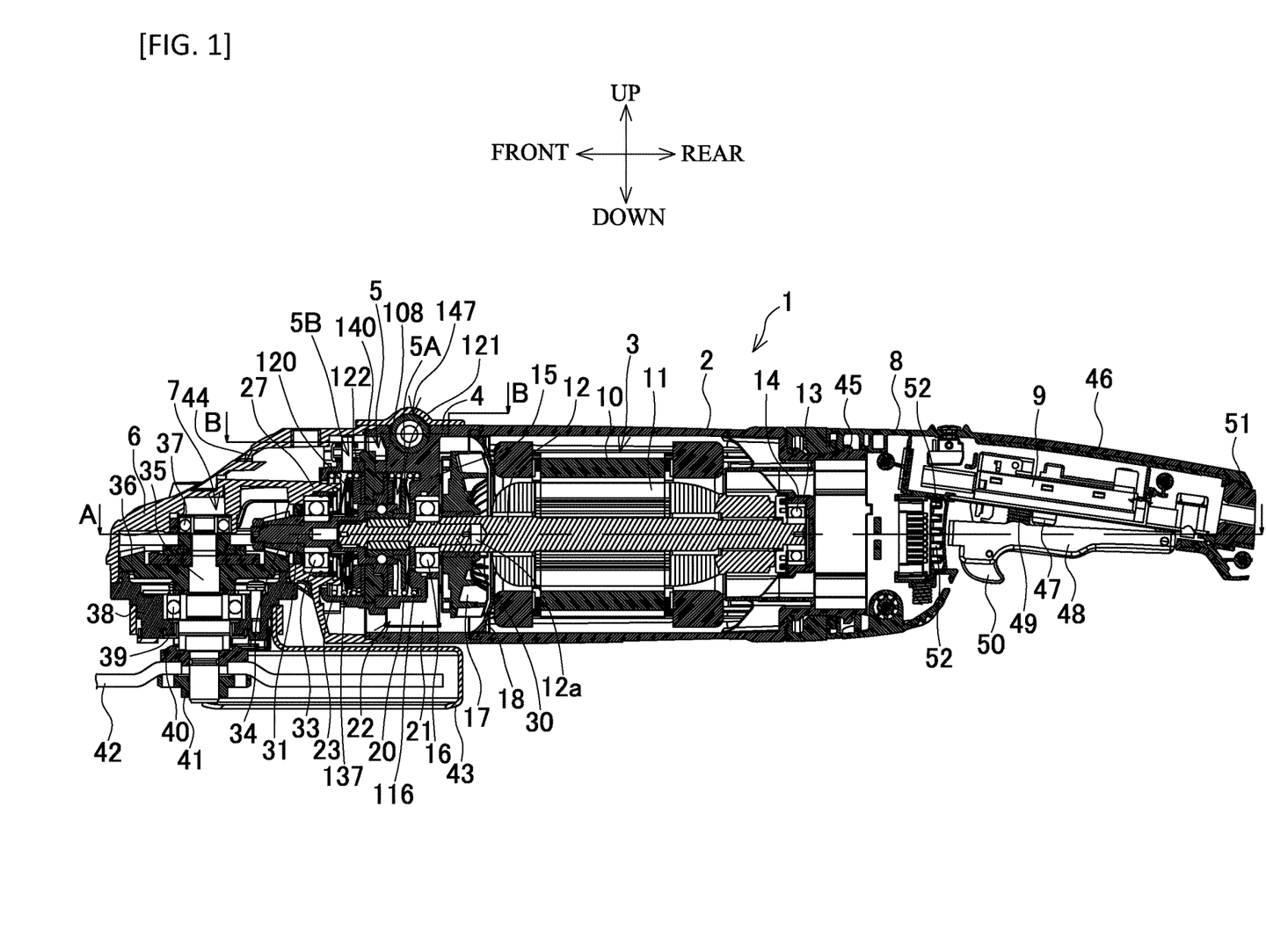
FIG. 1 is a vertical cross-sectional view of a grinder.

FIG. 1 is a vertical cross-sectional view of the grinder indicating an exemplary rotating tool. This grinder 1 includes a tubular motor housing 2, a similarly tubular intermediate housing 4, a gear housing 6, and a handle housing 8. The tubular motor housing 2 houses a motor (commutator motor) 3 and extends in a front-rear direction. The tubular intermediate housing 4 is assembled to the front of the motor housing 2 and houses a clutch/brake mechanism 5. The gear housing 6 is assembled to the front of the intermediate housing 4 and houses an output unit 7. The handle housing 8 is assembled in a rear portion of the motor housing 2 and houses a switch 9 and the like.

Figure 2A:
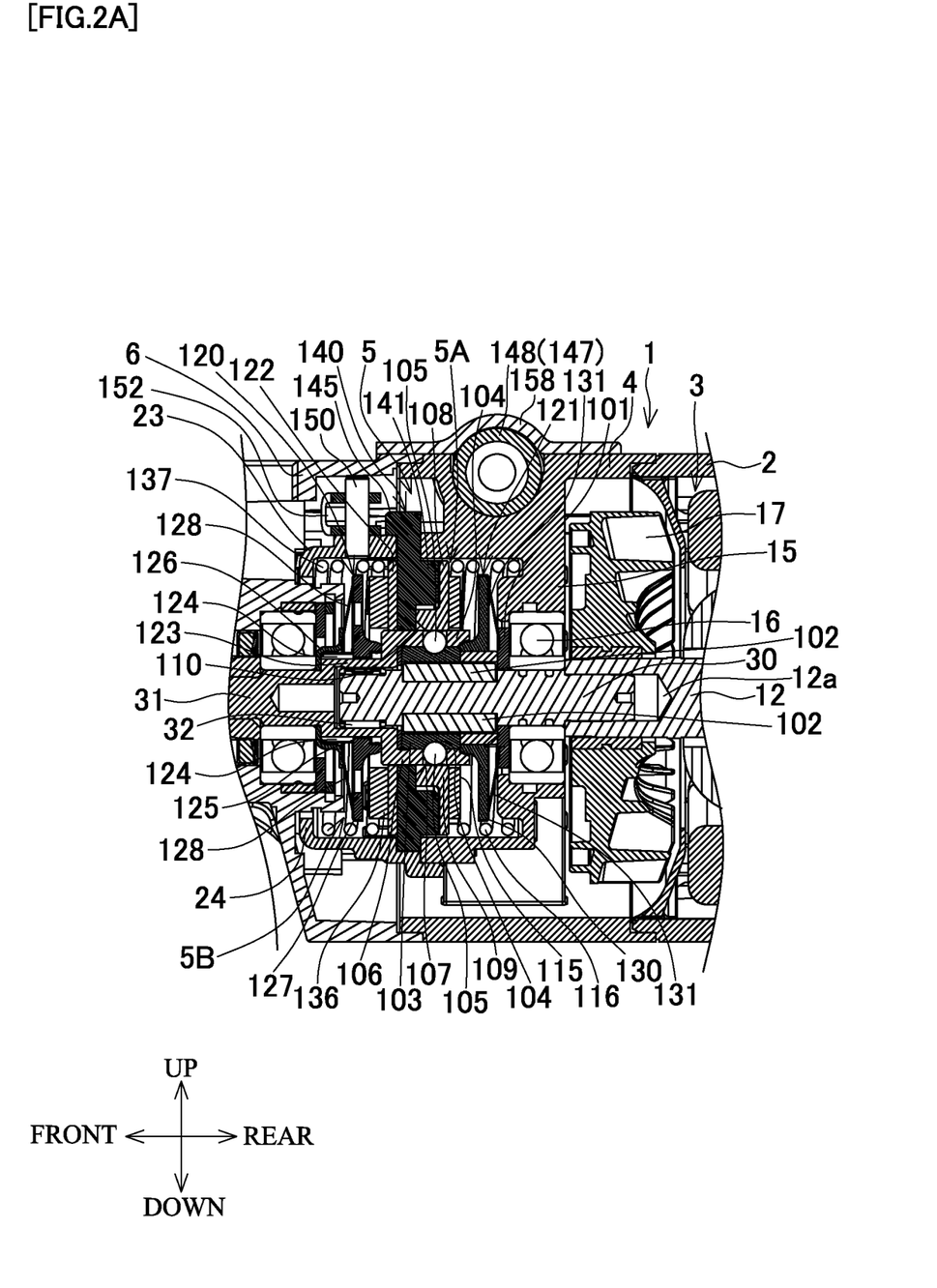

First, in the motor housing 2, the motor 3 that includes a stator 10 and a rotor 11 is housed in a posture with an output shaft 12 of the rotor 11 facing forward. The output shaft 12 has a rear end pivotally supported by a bearing 14 held in a bearing portion 13 inside the motor housing 2. The output shaft 12 has, as illustrated in FIG. 2, a front end coaxially and integrally fitted to a rear end of a drive shaft 30 inside the intermediate housing 4, and pivotally supported by a bearing 16 held on a partition wall 15 inside the intermediate housing 4, together with the rear end of the drive shaft 30. At the rear of the partition wall 15, a centrifugal fan 17 is disposed on the output shaft 12, and a baffle plate 18 is held between the motor housing 2 and the intermediate housing 4 in the rear of the centrifugal fan 17.

Figure 3:
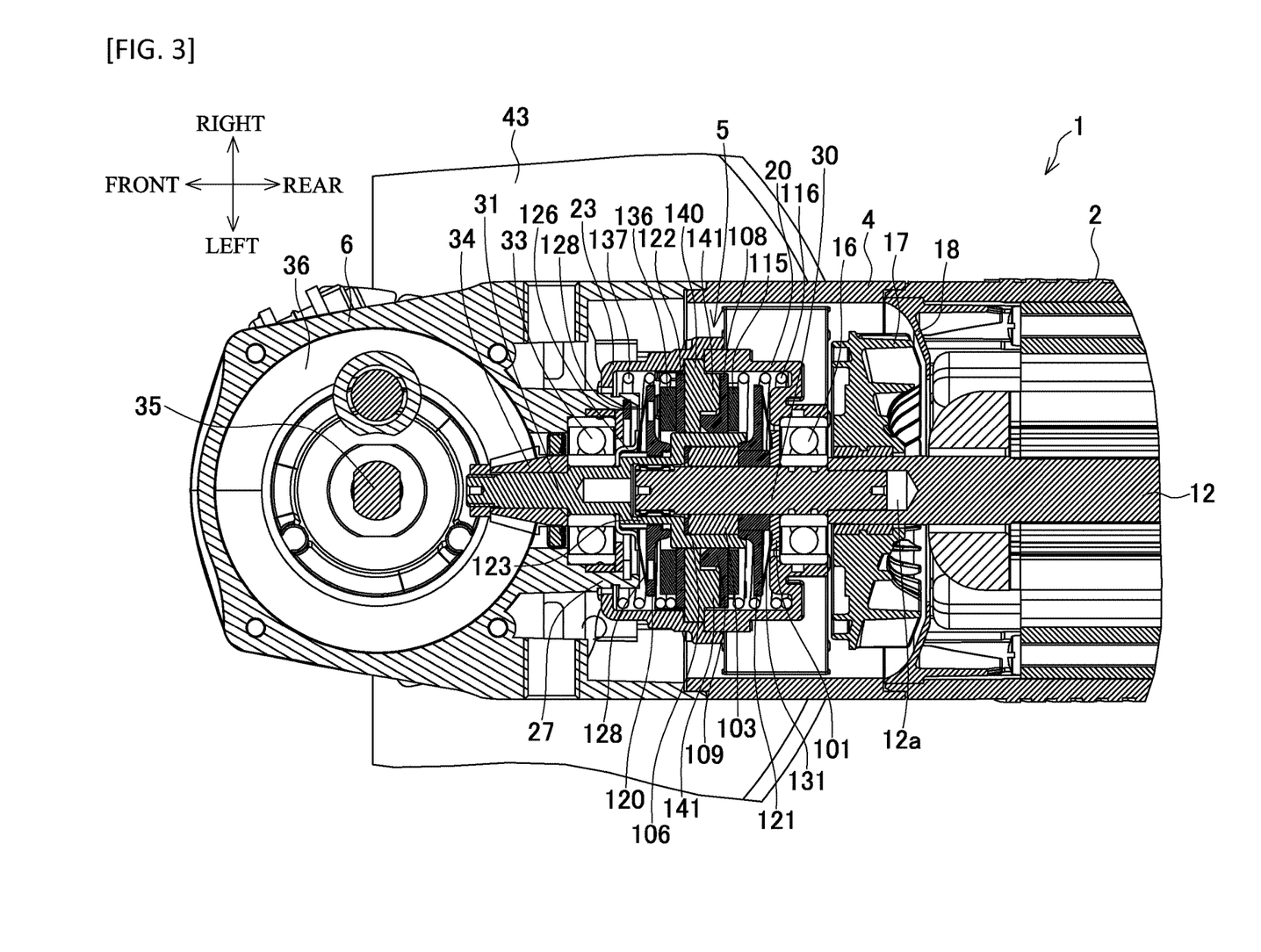
FIG. 3 is a cross-sectional view taken along the line A-A in FIG. 1.

As illustrated in FIG. 3, the intermediate housing 4 internally has an inner pipe 20 concentrically disposed with ribs 21, 21 . . . in a radiation direction, and the partition wall 15 obstructs a rear end inside the inner pipe 20. Ventilation passages 22, 22 . . . are formed between the respective ribs 21, 21 outside the inner pipe 20 so as to pass through in a front-rear direction to cause a side of the centrifugal fan 17 to communicate with a side of the gear housing 6.

In the front of the inner pipe 20, a cup 23 in a tubular shape having a diameter identical to that of the inner pipe 20 and includes an inwardly folded portion 24 in the front portion is disposed. The cup 23 has a rear end in a rear portion where four anchor pieces 25, 25 . . . are disposed to extend. The anchor pieces 25, 25 . . . are secured to the ribs 21 of the intermediate housing 4 with screws 26, 26 . . . (FIGS. 4, 5, and 7) from the front. In an assembled state of the intermediate housing 4 and the gear housing 6, the folded portion 24 of the cup 23 is coaxially fitted with a circular portion 27 disposed on a rear surface of the gear housing 6.

Inside the intermediate housing 4, in the front of the drive shaft 30 combined with the output shaft 12, a driven shaft 31 is disposed. The drive shaft 30 has a front end rotatably held onto a rear end of the driven shaft 31 in a coaxial and separated manner via a needle bearing 32 held onto the rear end of the driven shaft 31.

The driven shaft 31 passes through the folded portion 24 of the cup 23 and the circular portion 27 of the gear housing 6, and is pivotally supported by a bearing 33 held onto the circular portion 27 to project into the gear housing 6. The driven shaft 31 has a front end on which a bevel gear 34 is integrally disposed. Between this driven shaft 31 and the drive shaft 30, the clutch/brake mechanism 5 is disposed, and the details will be described below.

Within the gear housing 6, a spindle 35 as a rotation shaft is disposed in an up and down direction. The spindle 35 has an intermediate portion where a bevel gear 36 is disposed. The bevel gear 36 engages with the bevel gear 34 of the driven shaft 31. The spindle 35 is pivotally supported by an upper side bearing 37 held within the gear housing 6 and a lower side bearing 39 held by a retainer 38 combined to a lower side of the gear housing 6 to project the lower end downward from the retainer 38. The spindle 35 has a lower end on which a disk-shaped grinding wheel 42 as a tool bit is attachably/detachably mounted with an inner flange 40 and an outer flange 41. Reference numeral 43 is a wheel cover that is mounted on the retainer 38 and covers a rear half portion of the disk-shaped grinding wheel 42. Reference numerals 44, 44 . . . are exhaust outlets that communicate with the ventilation passages 22 of the intermediate housing 4 and open to a front surface.

Meanwhile, the handle housing 8 is made of a pair of half housings assembled from right and left by sandwiching a small-diameter portion 45 disposed in a rear end of the motor housing 2, and has a rear end where a handle portion 46 extending rearward is formed. Within the handle portion 46, the switch 9 with a controller that is a downwardly projected plunger 47 is disposed. The handle portion 46 has a lower side where a switch lever 48 as an operation member whose front end is upwardly and downwardly swingable with a rear end as a fulcrum is disposed. The switch lever 48 is biased at a swing position to the lower side by a coil spring 49. Here, when a hand gripping the handle portion 46 operates to upwardly push in the switch lever 48, the plunger 47 is pushed in to turn the switch 9 ON, and when the hand gripping the handle portion 46 releases the push-in of the switch lever 48, the plunger 47 projects to turn the switch 9 OFF. The switch lever 48 has a front end where a lock off lever 50 that is engaged with the handle housing 8 to restrict the push-in of the switch lever 48 is disposed. The handle portion 46 has a rear end to which a power supply cord 51 is connected. In the front of the handle portion 46 and on the right and left of the handle housing 8, a plurality of air inlets 52, 52 . . . are formed.

Figure 2B:
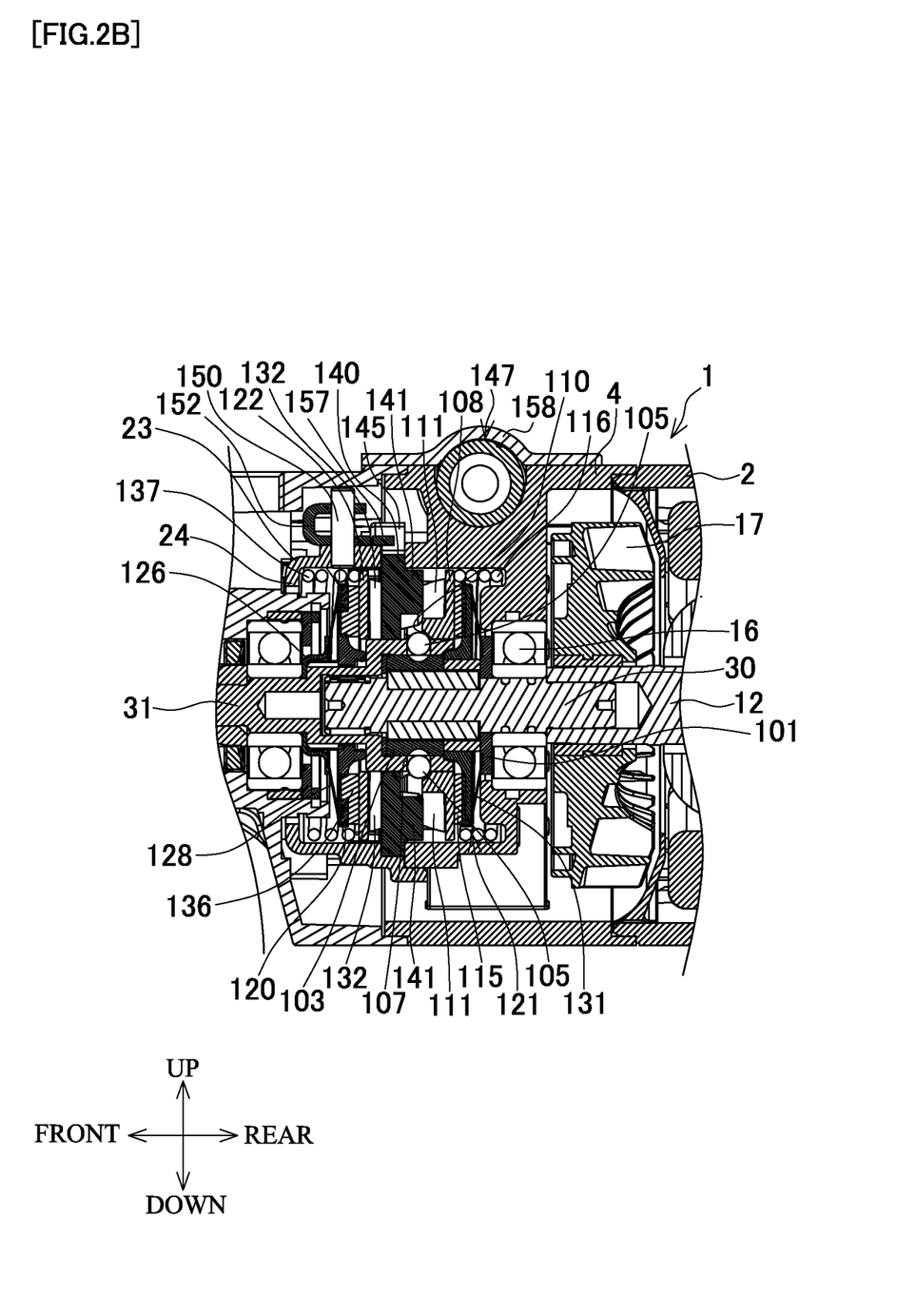
FIG. 2B is an explanatory drawing of a clutch/brake mechanism when the switch is turned OFF.

The clutch/brake mechanism 5 is, as illustrated in FIGS. 1 to 3, made of a clutch mechanism 5A disposed on a side of the drive shaft 30 and a brake mechanism 5B disposed on a side of the driven shaft 31.

First, the drive shaft 30 has a rear end press-fitted into a depressed portion 12a disposed on a distal end of the output shaft 12 to be integrated with the output shaft 12. On the drive shaft 30, a washer 101 is externally mounted in a front side of the bearing 16. In the front of the washer 101, a pair of keys 102, 102 are disposed at point symmetrical positions. The key 102 has a front side portion to which a sleeve 103 is key-connected.

Figure 4:
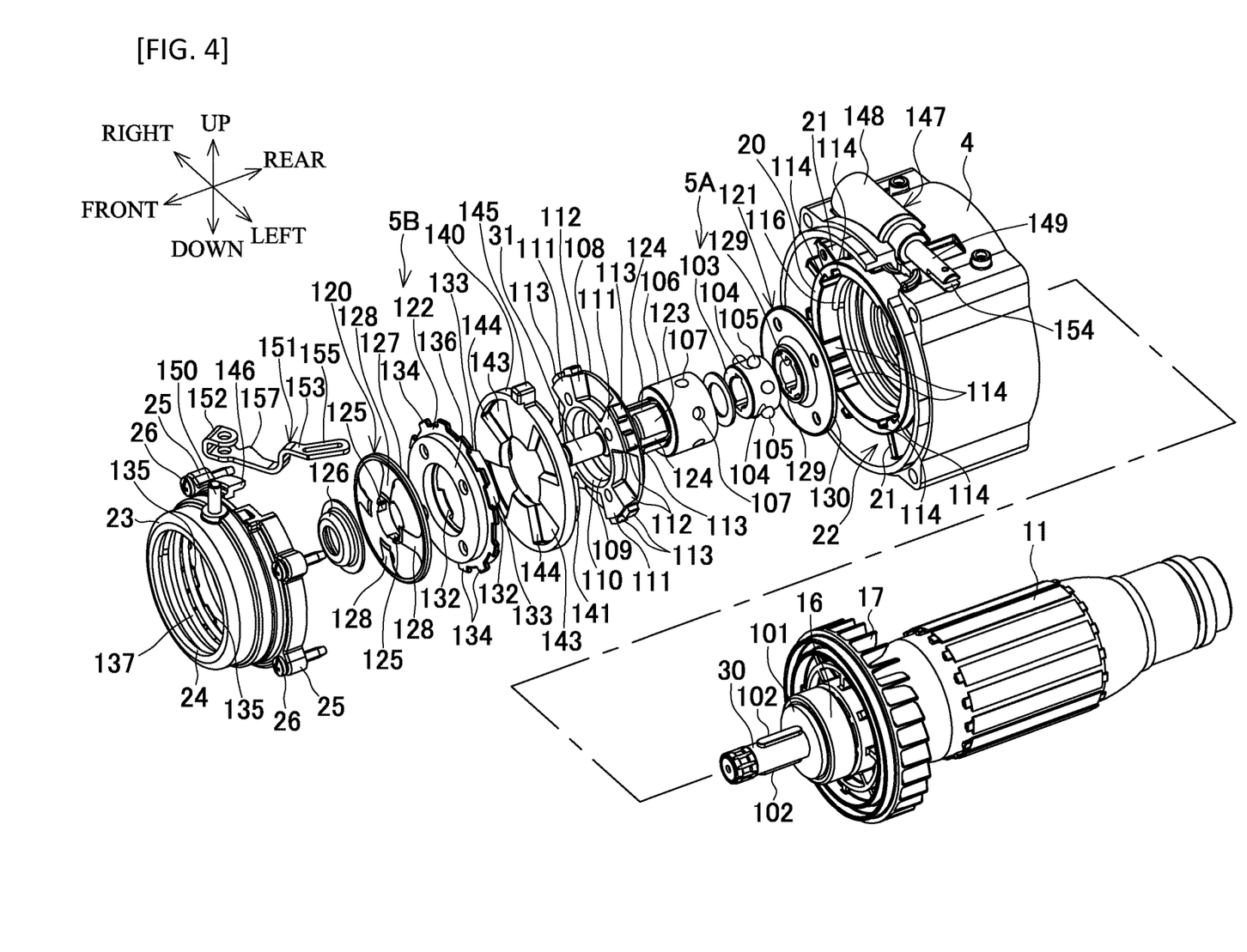
FIG. 4 is an exploded perspective view of the clutch/brake mechanism from a front.
Figure 5:
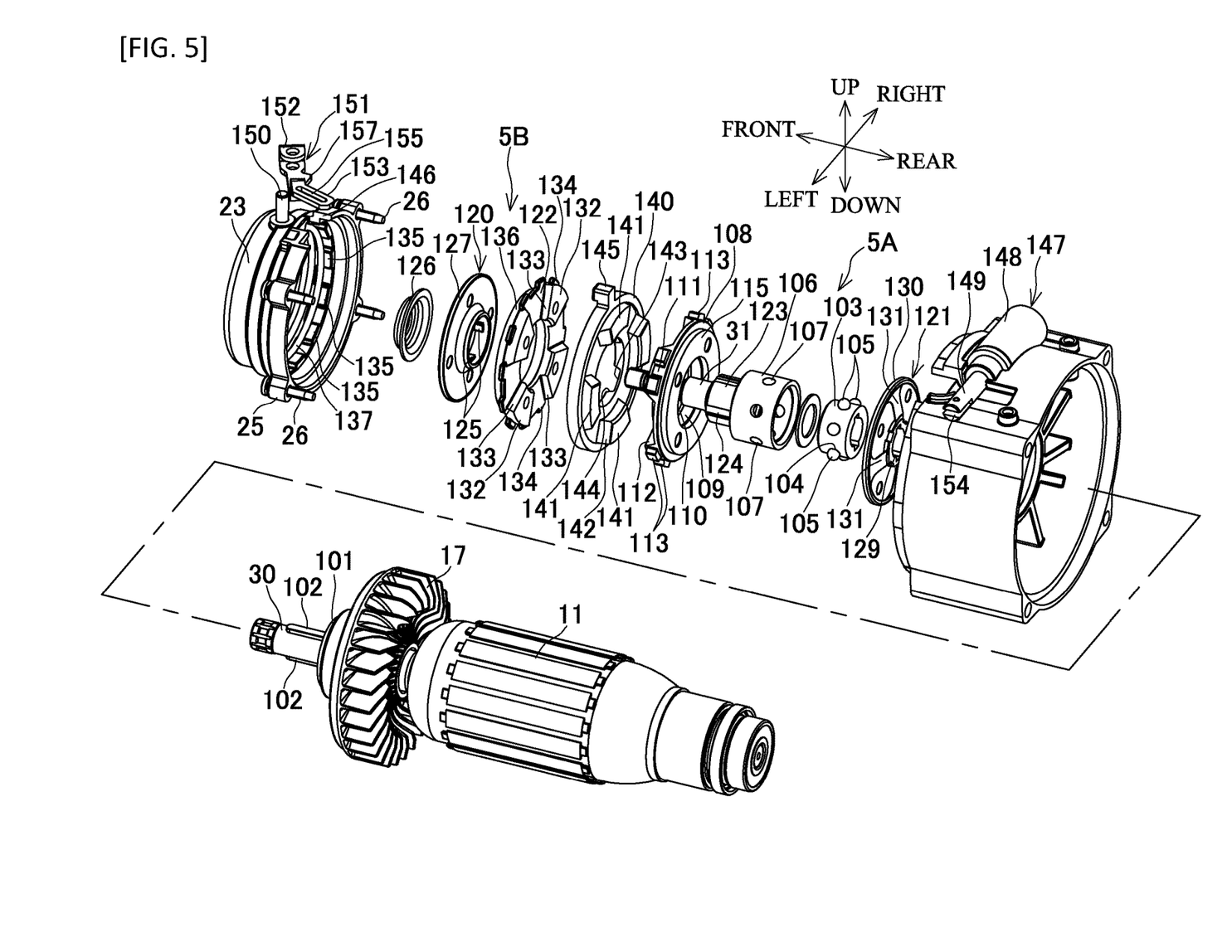
FIG. 5 is an exploded perspective view of the clutch/brake mechanism from a rear.

Here, as illustrated in FIGS. 4 and 5, the clutch mechanism 5A includes steel balls 105, 105 . . . , a large diameter portion 106, and a clutch operation plate 108. The steel balls 105, 105 . . . are as coupling bodies that fit to depressed portions 104, 104 . . . depressed and disposed at equal intervals in a circumferential direction on an outer peripheral surface of the sleeve 103. The large diameter portion 106 is disposed in the rear end of the driven shaft 31 to extend to cover the sleeve 103, and has through holes 107, 107 . . . into which the steel balls 105 that fit to the respective depressed portions 104 sink. The clutch operation plate 108 is externally mounted on the large diameter portion 106, has a thick wall portion 109 in the front-rear direction that covers the through holes 107, 107 . . . over the whole circumference on an inner peripheral front surface, and is movable back and forth in the axial direction. The thick wall portion 109 has an inner peripheral front side that forms a tapered surface 110 expanding as it approaches the front.

Accordingly, when the clutch operation plate 108 is positioned at an advance position where the thick wall portion 109 covers each of the through holes 107 over the whole circumference, a move of each of the steel balls 105 in the radial direction is restricted, thereby providing a clutch connecting state where the drive shaft 30 and the driven shaft 31 are coupled via the steel balls 105, 105 . . . that stride over the depressed portions 104 and the through hole 107.

Meanwhile, when the clutch operation plate 108 is at a retreated position where the tapered surface 110 of the thick wall portion 109 opens each of the through holes 107, the move of each of the steel balls 105 in the radial direction is allowed to fail maintaining fitting with the depressed portions 104, and fit only to the through holes 107, thereby providing a clutch cut-off state where the coupling of the drive shaft 30 and the driven shaft 31 is released.

The clutch operation plate 108 has four fan-shaped switching protrusions 111, 111 . . . on a front surface in an outer peripheral side of the thick wall portion 109 at equal intervals in the circumferential direction. The switching protrusions 111, 111 . . . widen as approaching outside in the radial direction. This switching protrusion 111 has a front surface formed into a thickness that provides a flush surface with the front surface of the thick wall portion 109 and has both side surfaces in the circumferential direction that form guide surfaces 112, 112 inclining to be gradually widened as approaching the rear. Each of the switching protrusions 111 has a peripheral surface outside in the radial direction on which a pair of projections 113, 113 are each disposed to project. The pair of projections 113, 113 are engaged with a pair of axial grooves 114, 114 correspondingly disposed on an inner peripheral surface of the inner pipe 20 of the intermediate housing 4. Accordingly, the clutch operation plate 108 is movable back and forth in a state where the rotation is restricted inside the inner pipe 20. Furthermore, the clutch operation plate 108 has a rear surface on which a rear brake shoe 115 is secured in a shape of a ring. A rear coil spring 116 as biasing means is interposed between the clutch operation plate 108 and the partition wall 15 outside the rear brake shoe 115 so as to bias the clutch operation plate 108 forward.

Next, the brake mechanism 5B includes a front brake plate 120 and a rear brake plate 121, and a brake operation plate 122 in addition to the clutch operation plate 108 including the rear brake shoe 115. The front brake plate 120 and the rear brake plate 121 are externally mounted on the driven shaft 31 and the drive shaft 30, respectively. The brake operation plate 122 is externally mounted in the front of the clutch operation plate 108 with a cam plate 140 described later interposed.

First, the front brake plate 120 is in a disk-shape having four inside projections 125, 125 . . . on an inner periphery. The inside projections 125, 125 . . . are fitted to four guide grooves 124, 124 . . . disposed in an intermediate portion 123 of the driven shaft 31. The front brake plate 120 is disposed to be movable back and forth and rotatable integrally with the driven shaft 31 between a cap 126 fitted to a front portion of the intermediate portion 123 and the large diameter portion 106. The front brake plate 120 has an outer periphery on which a retaining ring 127 as retaining means with four elastic pieces 128, 128 . . . projecting toward a center side and a front side is fitted. Each of the elastic pieces 128 pressing the cap 126 elastically holds the front brake plate 120 at a retreated position where the front brake plate 120 is brought into contact with the front surface of the large diameter portion 106.

The rear brake plate 121 is in a disk-shape having key grooves 129, 129 fitted with the keys 102, 102 of the drive shaft 30 on an inner periphery. The rear brake plate 121 is disposed to be movable back and forth and rotatable integrally with the drive shaft 30 between the washer 101 and the sleeve 103. The rear brake plate 121 also has an outer periphery on which a retaining ring 130 as retaining means with four elastic pieces 131, 131 . . . projecting toward a center side and a rear side is fitted at the rear portion. Each of the elastic pieces 131 pressing the washer 101 elastically holds the rear brake plate 121 at an advance position where the rear brake plate 121 is brought into contact with the sleeve 103.

The brake operation plate 122 is in a disk-shape that has a diameter identical to that of the clutch operation plate 108 and is externally mounted on the large diameter portion 106. The brake operation plate 122 has a rear surface on which four fan-shaped switching protrusions 132, 132 . . . that widen as approaching outside in the radial direction at equal intervals in the circumferential direction, similarly to the clutch operation plate 108. This switching protrusion 132 also has both side surfaces in the circumferential direction that form guide surfaces 133, 133 inclining to be gradually widened as approaching the front.

The brake operation plate 122 has an outer periphery on which a plurality of projecting pieces 134, 134 . . . are formed at equal intervals. The plurality of projecting pieces 134, 134 engaging between axial projections 135, 135 . . . disposed at equal intervals in the circumferential direction on the inner periphery of the cup 23 causes the brake operation plate 122 to be movable back and forth in a state where the rotation is restricted. The switching protrusion 111 of the clutch operation plate 108 and the switching protrusion 132 of the brake operation plate 122 both restricted from rotating are positioned in the same phase opposing one another.

Furthermore, the brake operation plate 122 has a front surface to which a ring-shaped front brake shoe 136 is fixed. Outside the front brake shoe 136 and between the brake operation plate 122 and the folded portion 24 of the cup 23, a front coil spring 137 as biasing means is interposed to bias the brake operation plate 122 rearward.

The circular plate-shaped cam plate 140 is rotatably and externally mounted on the large diameter portion 106 between the clutch operation plate 108 and the brake operation plate 122. This cam plate 140 has four cam projections 141, 141 . . . fitted between the switching protrusions 111, 111 . . . of the clutch operation plate 108 on a rear surface. The cam projections 141, 141 . . . are in a shape where both side surfaces in the circumferential direction are similarly formed into inclined surfaces 142, 142.

The cam plate 140 has a front surface on which four cam depressed portions 143, 143 . . . positioned between the cam projections 141, 141 in the axial direction and fitted with the switching protrusions 132, 132 . . . of the brake operation plate 122 are formed in a shape where both side surfaces in the circumferential direction are similarly formed into inclined surfaces 144, 144. The cam plate 140 has an upper portion where a square-shaped engaging projection 145 is upwardly disposed to protrude. The engaging projection 145 projects upward via a cutout 146 disposed in the rear end of the cup 23.

Figure 6:
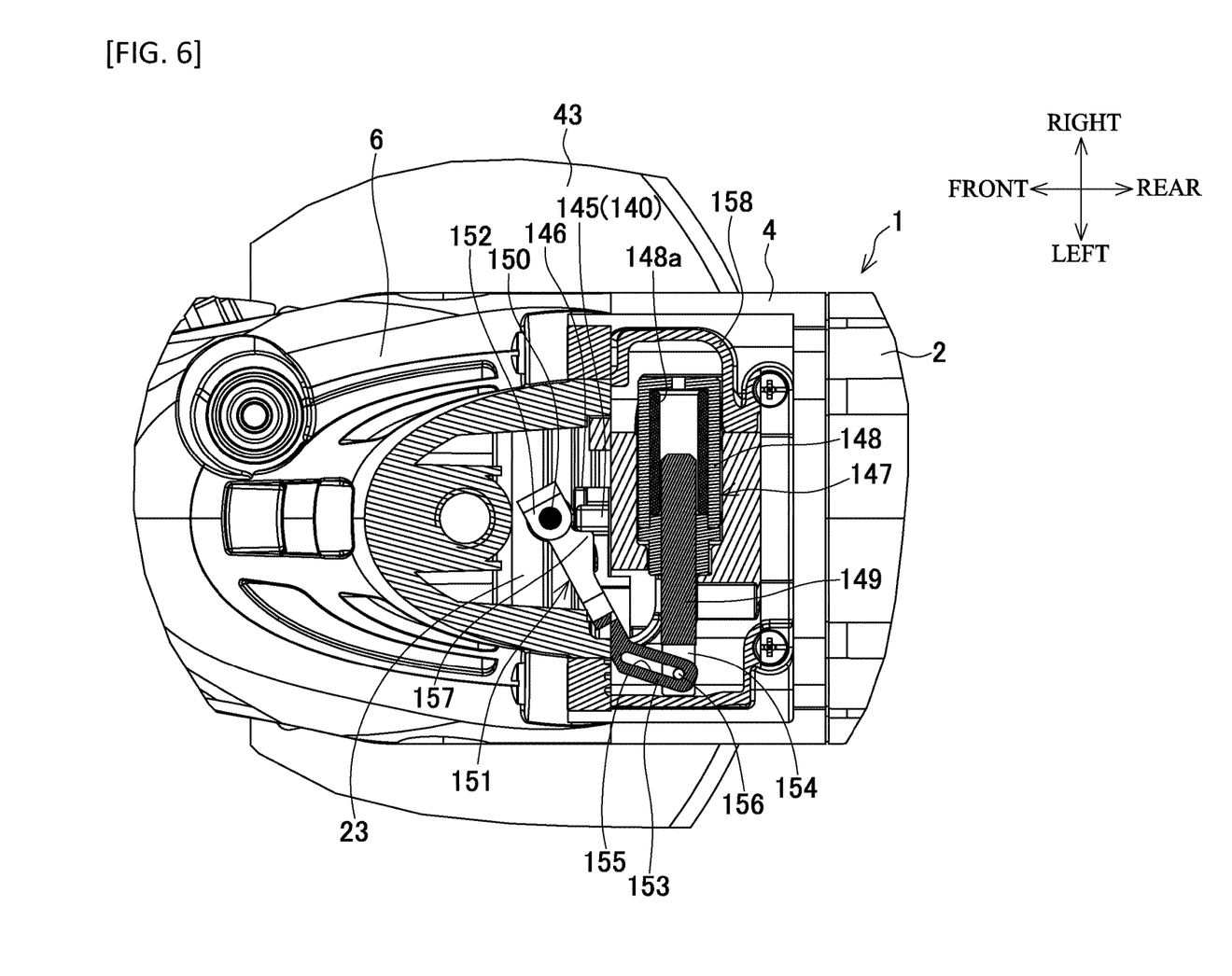
FIG. 6 is a cross-sectional view taken along the line B-B in FIG. 1.

Meanwhile, the intermediate housing 4 has an upper surface to which a solenoid 147 is secured with a plunger 149 being in sideways facing the left direction as illustrated also in FIG. 6. The solenoid 147 is as an electrical actuator including a main body 148 incorporated with a coil 148a and the plunger 149 that can appear from the main body 148.

The front of the solenoid 147 and on an upper surface of the cup 23, a pin 150 is disposed upright in the up and down direction, and a rotation lever 151 as a linking member is rotatably supported by the pin 150.

This rotation lever 151 is a strip-shaped member in which a fulcrum portion 152 bent upward for making a U-shape is rotatably supported by the pin 150 to horizontally extend. The rotation lever 151 has a distal end side where an effort portion 153 is bent upward for making an inverted L-shape and is inserted into a slit 154 disposed at a distal end of the plunger 149 of the solenoid 147. The effort portion 153 has a distal end where an elongate hole 155 is formed. A locking pin 156 disposed in the plunger 149 inside the slit 154 is movably inserted into this elongate hole 155, and thus, the effort portion 153 is coupled to the plunger 149.

On a rear edge in the rotation lever 151 on a side of the effort portion 153 with respect to the fulcrum portion 152, a mountain-shaped load portion 157 is formed.

Figure 7A:
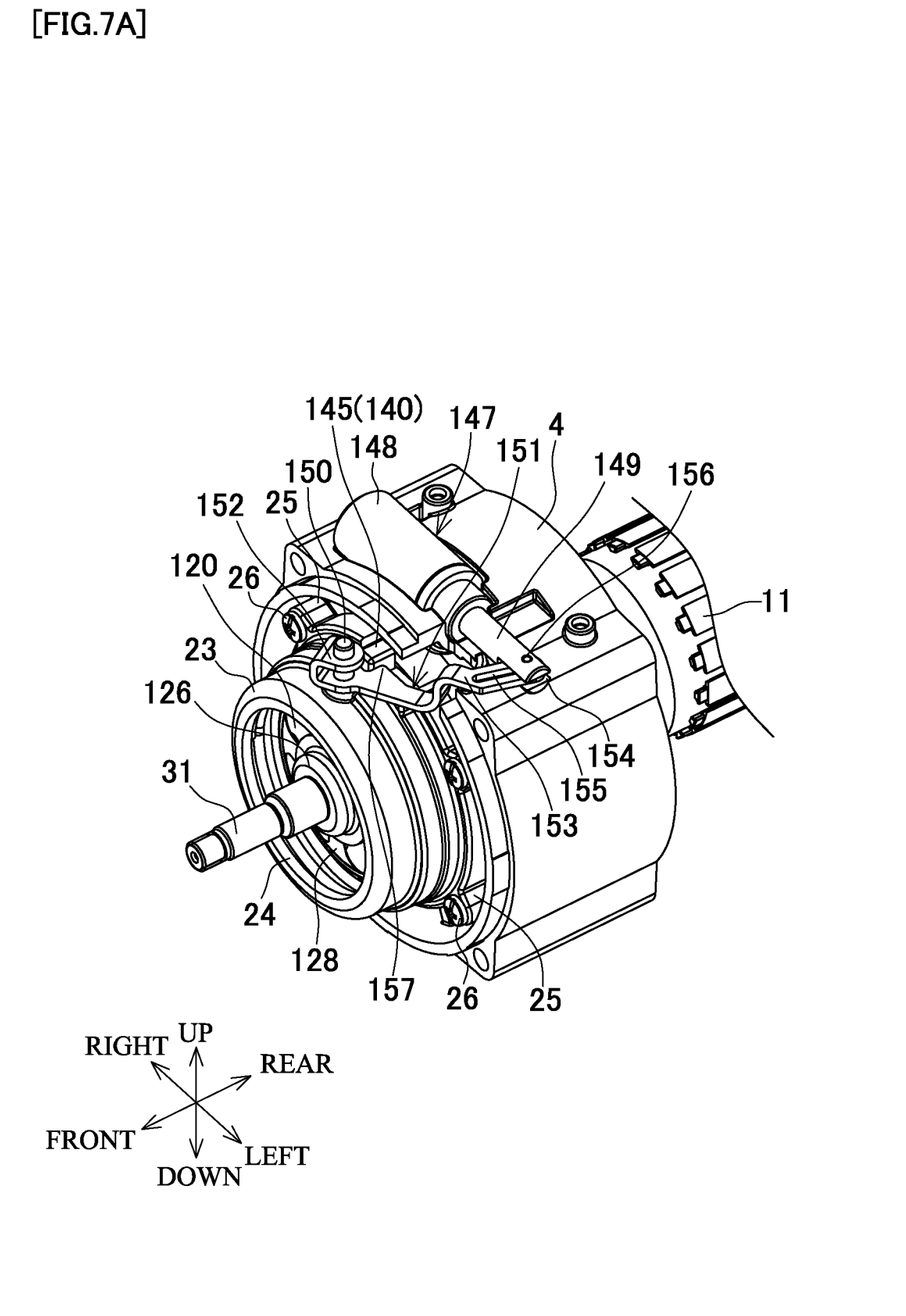
FIG. 7A is a perspective view of an operation of a solenoid when the solenoid is turned OFF.

Here, when the solenoid 147 is in an OFF (non-energized) state, as illustrated in FIG. 7(A), the plunger 149 is at a projecting position from the main body 148, and the load portion 157 is positioned on the left side of the engaging projection 145 of the cam plate 140. At this time, as illustrated in FIG. 2(A) and FIG. 3, the cam plate 140 has the clutch operation plate 108 pressed from the rear by the rear coil spring 116 and the brake operation plate 122 pressed from the front by the front coil spring 137. Thus, the cam projections 141, 141 of the cam plate 140 are fitted between the switching protrusions 111, 111 of the clutch operation plate 108, and each of the switching protrusion 132 of the brake operation plate 122 is at a left rotation position where the switching protrusions 132 are fitted to the respective cam depressed portions 143 of the cam plate 140.

Accordingly, the clutch operation plate 108 has a rear side of the thick wall portion 109 covering the through hole 107 of the large diameter portion 106 to restrict the moves of the steel balls 105, 105 . . . , and is at the advance position (clutch connection position, the drive shaft 30 side brake release position) where the rear brake shoe 115 is separated forward from the rear brake plate 121.

The brake operation plate 122 has the respective switching protrusions 132 being fitted to the cam depressed portions 143, and thus, the brake operation plate 122 is at the retreated position (the driven shaft 31 side brake release position) where the front brake shoe 136 is separated from the front brake plate 120 to the rear.

Figure 7B:
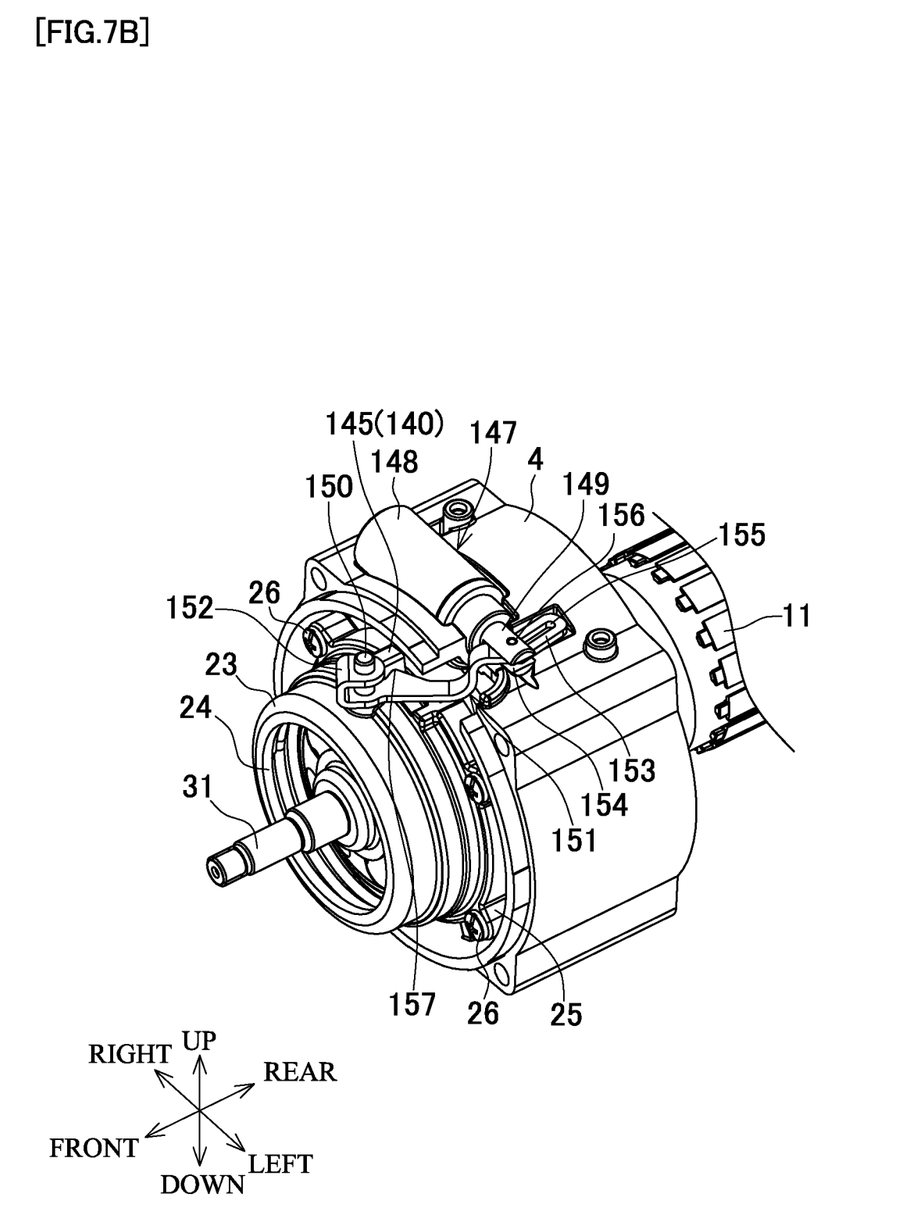

Meanwhile, when the solenoid 147 is turned ON (energized), as illustrated in FIG. 7(B), the plunger 149 is drawn into the main body 148, and the rotation lever 151 is rotated to the left in plan view about the pin 150. Then, the load portion 157 presses the engaging projection 145 from the left side to rotate the cam plate 140 to the right. This right side rotation causes the switching protrusions 111 of the clutch operation plate 108 fitted between the cam projections 141, 141 of the cam plate 140 to be pushed out to the rear by a guide of the guide surface 112 and the inclined surface 142, as illustrated in FIG. 2(B). Therefore, the clutch operation plate 108 resists against the biasing of the rear coil spring 116 to retreat to the retreated position (clutch cut-off position) where the tapered surface 110 of the thick wall portion 109 is located outside the through hole 107 of the large diameter portion 106. Accordingly, each of the steel balls 105 is allowed to move in the radial direction to fail maintaining the fitted state to the depressed portions 104, thereby providing a power cut-off state where the rotation of the drive shaft 30 is not transmitted to the driven shaft 31.

The retreat of the clutch operation plate 108 brings the rear brake shoe 115 into contact with the rear brake plate 121 to apply a brake to the drive shaft 30 via the rear brake plate 121 (the drive shaft 30 side brake position). That is, the clutch operation plate 108 also serves as a second brake operation plate, and thus, the brake mechanism 5B includes the brake mechanism by the brake operation plate 122 and the front brake plate 120, and the second brake mechanism by the clutch operation plate 108 and the rear brake plate 121.

Furthermore, each of the switching protrusions 132 of the brake operation plate 122 fitted to each of the cam depressed portions 143 of the cam plate 140 are pushed out to the front by the guide of the inclined surface 144 and the guide surface 133. Therefore, the brake operation plate 122 resists against the biasing of the front coil spring 137 to bring the front brake shoe 136 into contact with the front brake plate 120, and moves forward to the advance position (the driven shaft 31 side brake position) where a brake is applied to the driven shaft 31 via the front brake plate 120.

It should be noted that the rotation lever 151 has the pin 150 and the engaging projection 145 as well as the fulcrum portion 152 and the load portion 157 housed inside the upper side of the gear housing 6, and the effort portion 153 projecting to an upper side of an upper surface of the intermediate housing 4. The intermediate housing 4 has the upper surface on which an upper cover 158 covering the solenoid 147 and the effort portion 153 of the rotation lever 151 is screwed.

In the grinder 1 configured as described above, when the switch 9 is in the OFF state, the solenoid 147 is OFF and the plunger 149 is at the projecting position. Accordingly, since the cam plate 140 is at the left side rotation position as described above, the clutch operation plate 108 is at the advance position, and thus, the clutch of the clutch mechanism 5A is in the connecting state and the braking to the drive shaft 30 is released. The brake operation plate 122 is at the retreated position, and the braking to the driven shaft 31 is released.

In that state, releasing the lock off lever 50, and operating to push in the switch lever 48 to turn the switch 9 ON drives the motor 3 to rotate the output shaft 12 with the rotor 11. Accordingly, the drive shaft 30 integral with the output shaft 12 also rotates (here, rotates to the right toward the front). Then, the driven shaft 31 connected to the drive shaft 30 via the steel balls 105, 105 . . . of the clutch mechanism 5A also rotates integrally with the drive shaft 30, to rotate the spindle 35 via the bevel gears 34, 36 to rotate the disk-shaped grinding wheel 42.

Releasing the push-in operation of the switch lever 48 and turning the switch 9 OFF stop the energization to the motor 3. At this time, a delay circuit disposed in the controller turns the solenoid 147 ON to draw the plunger 149 in, after a lapse of a certain period of time (several seconds) after the switch 9 is turned OFF, and thus, the rotation lever 151 is rotated. The reason for thus waiting for the lapse of the certain period of time after the switch 9 is turned OFF is that there is a case where it is desired to perform the operation by operating to push in the switch lever 48 again after the switch 9 is turned OFF.

Then, the cam plate 140 is rotated to the right, and the clutch operation plate 108 retreats by resisting against the biasing of the rear coil spring 116 as described above to release the pressing of the steel balls 105, 105 . . . by the thick wall portion 109 in the clutch mechanism 5A. Therefore, the power transmission from the drive shaft 30 to the driven shaft 31 is cut off.

Simultaneously, the rear brake shoe 115 of the clutch operation plate 108 presses the rear brake plate 121, and thus, a brake is applied to the drive shaft 30 and the output shaft 12 via the rear brake plate 121. The brake operation plate 122 also moves forward, and the front brake shoe 136 presses the front brake plate 120, and thus, a brake is applied to the driven shaft 31 via the front brake plate 120. At this time, the front brake plate 120 and the rear brake plate 121 are elastically moved by the elastic pieces 128, 131 when being pressed to the front brake shoe 136 and the rear brake shoe 115, thereby reducing an impact at the braking.

Consequently, the disk-shaped grinding wheel 42 stops immediately via the spindle 35. After the lapse of the certain period of time after the switch 9 is turned OFF, the solenoid 147 is turned OFF to return the cam plate 140 to the left side rotation position, and the clutch operation plate 108 returns to the advance position and the brake operation plate 122 returns to the retreated position. Note that the controller controls such that the motor 3 is not redriven even though the switch lever 48 is operated and pushed in until the solenoid 147 is turned OFF after the solenoid 147 is turned ON and the brake mechanism 5B is actuated.

Thus, the grinder 1 of the above-described configuration includes the brake mechanism 5B configured to brake the spindle 35 and the electrical actuator (the solenoid 147) that actuates the brake mechanism 5B. The electrical actuator actuates the brake mechanism 5B in conjunction with the turning OFF of the switch 9 from the driving state of the motor 3 and releases the actuation of the brake mechanism 5B after the lapse of the predetermined period of time from the turning OFF of the switch 9, thereby ensuring braking the rotation of only the spindle 35 side. Accordingly, even the grinder 1 large in size can reliably brake the disk-shaped grinding wheel 42 with an energy smaller than a conventional energy. Since a necessity to dispose the coupled mechanism between the brake mechanism 5B and the switch lever 48 is eliminated, the structure is simplified, and a failure to the cooling flow passage of the motor 3 and an influence by a heat generation of the brake can be reduced. Furthermore, since the brake mechanism 5B is released in an initial state where the grinder 1 is not used, a responsiveness to an ON operation of the switch 9 by the switch lever 48 improves, and no time lag is generated in the rotation of the disk-shaped grinding wheel 42.

Here in particular, the brake mechanism 5B is actuatable with a simple configuration since the electrical actuator is the solenoid 147.

While the brake mechanism 5B includes the brake operation plate 122 that contacts and separates from the front brake plate 120 disposed on the spindle 35 side, between the output shaft 12 and the spindle 35, the clutch mechanism 5A configured to connect and cut off the power from the output shaft 12 to the spindle 35 side is disposed. The clutch mechanism 5A includes the clutch operation plate 108 that moves in the axial direction of the output shaft 12 to switch between connection and cut-off of the power. Between the brake operation plate 122 and the clutch operation plate 108, the cam plate 140 is disposed. The cam plate 140 rotates in association with an operation of the solenoid 147 to cause the brake operation plate 122 to contact and separate from the front brake plate 120 and cause the clutch operation plate 108 to move in the axial direction.

Consequently, the brake mechanism 5B and the clutch mechanism 5A ensure operating by the move of only one cam plate 140, thereby ensuring a downsizing in the axial direction even though both the mechanisms are attached.

Furthermore, the clutch mechanism 5A including the coupling body (the steel ball 105) that moves in the radial direction between the drive shaft 30 on the output shaft 12 side and the driven shaft 31 on the spindle 35 side to couple the two and releases the coupling ensures the downsized clutch mechanism 5A in the radial direction.

Meanwhile, the solenoid 147 and the cam plate 140 are linked with the linking member (the rotation lever 151), and the cam plate 140 rotates via the rotation lever 151 in association with the operation of the solenoid 147, thereby ensuring converting the operation of the solenoid 147 to the rotation of the cam plate 140.

The linking member being the rotation lever 151 that has the fulcrum portion 152 that serves as the rotational center, the effort portion 153 to which the solenoid 147 is coupled to rotate about the fulcrum portion 152, and the load portion 157 formed between the fulcrum portion 152 and the effort portion 153 to engage with the cam plate 140 ensures easily rotating the cam plate 140 using the rotation lever 151.

Furthermore, the biasing means (the front coil spring 137 and the rear coil spring 116) that biases the brake operation plate 122 and the clutch operation plate 108 to the cam plate 140 side is provided. Thus, the brake operation plate 122 and the clutch operation plate 108 can reliably be in conjunction with the rotation of the cam plate 140.

In addition, the retaining means (the retaining ring 127, 130) that elastically holds the front brake plate 120 and the rear brake plate 121 with respect to a contacting and separating direction of the brake operation plate 122 and the clutch operation plate 108 is provided. Thus, the impact at braking can be reduced.

The brake mechanism 5B further includes the second brake mechanism configured to brake the output shaft 12. The second brake mechanism also being actuated and released from actuation by the solenoid 147 ensures cutting off the power to the spindle 35 side and applying a brake with respect to the output shaft 12 side.

While the brake mechanism 5B is actuating, redriving of the motor 3 is restricted even though the switch 9 is turned ON, thereby ensuring reliably applying a brake.

Furthermore, the solenoid 147 actuates the brake mechanism 5B after the lapse of the predetermined period of time from the turning OFF of the switch 9 from the driving state of the motor 3, thereby ensuring performing the repeated operation of turning the switch 9 ON and OFF with no obstacle.

It should be noted that, while in the above-described configuration, the rear brake shoe is disposed on the clutch operation plate, and the rear brake plate is disposed at the rear of the rear brake shoe to dispose the second brake mechanism, the second brake mechanism may be omitted to have only a configuration that biases the clutch operation plate to the cam plate with the rear coil spring. It is possible to omit the clutch mechanism as well to have only a configuration that actuates the brake mechanism on the spindle side with the electrical actuator.

A coil spring or the like externally mounted on the driven shaft is permitted to be used instead of the retaining ring with the elastic piece for the retaining means of the brake plate.

Furthermore, in the above-described configuration, the driven shaft is externally mounted on the drive shaft and is coupled using the steel balls, in an opposite manner, the drive shaft may be externally mounted on the driven shaft and may be coupled using the coupling bodies, such as the steel balls. It is also permitted to form the drive shaft integral with the output shaft without forming the drive shaft as a separate body from the output shaft. The coupling body is not limited to the steel balls, but a roller shape having a length in the axial direction can be employed.

Meanwhile, the solenoid may be disposed on a lateral side or a lower side, not limited to the upper side of the housing. The linking member is not limited to the rotation lever, and can be a swing lever with a center rotatably coupled to the housing side, one end coupled to the cam plate, and the other end coupled to the plunger of the solenoid such that the cam plate is rotated to an opposite direction of the appearing direction of the plunger.

It is possible to omit such a linking member to directly link the cam plate to the plunger.

One or both of the drive shaft on the output shaft side and the driven shaft on the spindle (rotation shaft) side may be omitted, and the clutch/brake mechanism may be directly disposed between the output shaft and the rotation shaft.

It is also possible to add an electric brake function to the motor to use in combination with the mechanical brake of the above-described configuration. In this case, it is preferred to, first, apply a brake with the electric brake after the switch is turned OFF, and then, apply a brake with the mechanical brake. Note that, in the case of this combination type, the structure of the mechanical brake is not limited to the above-described configuration, but another construction can be employed.

Moreover, the present invention is applicable even though a battery pack is used as the power source, a brushless motor is used as the motor, or the rotating tool is another rotating tool, such as a sander.

The invention claimed is:

1. A rotating tool comprising:
a motor;
a switch that has ON and OFF states in association with an operation of an operation member to control a rotation of an output shaft of the motor;
a rotation shaft (1) configured to rotate in association with the rotation of the output shaft to rotate a tool bit and (2) that includes a brake plate;
a brake mechanism (1) configured to brake at least the rotation shaft and (2) that includes a brake operation plate;
an electrical actuator that is configured to actuate the brake mechanism; and
a clutch mechanism, configured to operatively connect and separate the output shaft and the rotation shaft, is between the output shaft and the rotation shaft, wherein:
the electrical actuator is configured to actuate the brake mechanism in conjunction with switching the switch from the ON state to the OFF state and to release an actuation of the brake mechanism after a lapse of a predetermined period of time from the switching of the switch from the ON state to the OFF state;
the electrical actuator, the rotation shaft and the brake mechanism are configured such that operation of the electrical actuator causes the brake operation plate to engage and disengage the brake plate;
the clutch mechanism includes a clutch operation plate that moves in an axial direction of the output shaft to operatively connect and separate the output shaft and the rotation shaft;
a cam plate is between the brake operation plate and the clutch operation plate; and
the cam plate and the brake operation plate are configured such that the cam plate rotates in association with the operation of the electrical actuator to cause the brake operation plate to contact and separate from the brake plate and cause the clutch operation plate to move in the axial direction.

2. The rotating tool according to claim 1, wherein the electrical actuator is a solenoid.

3. The rotating tool according to claim 1, wherein the clutch mechanism includes a coupling body that is configured to move in a radial direction between a side of the output shaft and the rotation shaft to couple the release the output shaft and the rotation shaft.

4. The rotating tool according to claim 3, wherein the coupling body is a steel ball.

5. The rotating tool according to claim 1, wherein the electrical actuator and the cam plate are linked with a linking member, and the cam plate, the electrical actuator and the linking member are configured such that the cam plate rotates via the linking member in association with the operation of the electrical actuator.

6. The rotating tool according to claim 5, wherein the linking member is a rotation lever that has a fulcrum portion that is a rotational center of the rotation lever, an effort portion to which the electrical actuator is coupled and which is configured to rotate about the fulcrum portion, and a load portion between the fulcrum portion and the effort portion that engages the cam plate.

7. The rotating tool according to claim 1, further comprising
a biasing member that biases the brake operation plate to a side of the cam plate.

8. The rotating tool according to claim 7, wherein the biasing member is a coil spring.

9. The rotating tool according to claim 1, further comprising
a retaining member that elastically holds the brake plate with respect to a contacting and separating direction of the brake operation plate.

10. The rotating tool according to claim 9, wherein the retaining member is a retaining ring on an outer periphery of the brake plate, the retaining ring having a plurality of elastic pieces projecting toward a center side and an opposite side of the brake operation plate.

11. The rotating tool according to claim 1, further comprising
a second brake mechanism configured to (1) brake the output shaft and (2) be actuated and released from actuation by the electrical actuator.

12. The rotating tool according to claim 1, wherein the brake mechanism and the motor are configured such that, when the brake mechanism is actuating, redriving of the motor is restricted even when the switch is in the ON state.

13. The rotating tool according to claim 1, wherein the electrical actuator and the brake mechanism are configured such that the electrical actuator actuates the brake mechanism after a lapse of a second predetermined period of time from the switching of the switch from the ON state to the OFF state while the motor is being driven.

14. The rotating tool according to claim 1, wherein:
the brake mechanism and the rotation shaft are configured such that the brake mechanism, when actuated, brakes the rotation shaft;
the clutch mechanism includes a sleeve fixedly attached to the output shaft; and
the sleeve and the clutch operation plate are configured such that the sleeve and the clutch operation plate can be coupled and uncoupled.

15. The rotating tool according to claim 1, wherein:
the brake mechanism includes a front brake plate and a back brake plate; and
the front brake plate and the back plate brake are on opposite sides of the clutch operation plate.

16. The rotating tool according to claim 1, wherein:
the cam plate includes, in the axial direction of the output shaft, spaced protrusion portions and spaced depressed portions;
the spaced protrusion portions and the spaced depressed portions alternate circumferentially;
an inclined surface is between each adjacent spaced protrusion portion and spaced depressed portion that is inclined with respect to the axial direction; and
the clutch mechanism and the cam plate are configured such that the clutch operation plate selectively engages the spaced protrusion portions, the spaced depressed portions and the inclined surfaces to move the clutch operation plate in the axial direction.

* * * * *